(12) United States Patent
Sanchez et al.

(10) Patent No.: US 7,747,970 B2
(45) Date of Patent: Jun. 29, 2010

(54) PREVIEWS OF INFORMATION FOR SELECTED DOWNLOAD ON AUXILIARY DISPLAY

(75) Inventors: Russell I. Sanchez, Medina, WA (US); Jonathan C. Kagle, Bellevue, WA (US); Barbary J. Brunner, Mercer Island, WA (US); Courtney L. Latta, Snoqualmie, WA (US); Richard A. Barrie, Kirkland, WA (US); Roger B. Gulrajani, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 1052 days.

(21) Appl. No.: 11/003,931

(22) Filed: Dec. 3, 2004

(65) Prior Publication Data

US 2006/0123335 A1    Jun. 8, 2006

(51) Int. Cl.
G06F 3/14        (2006.01)
(52) U.S. Cl. .................................... 715/864; 715/764
(58) Field of Classification Search .............. 715/516, 715/517, 525, 864
See application file for complete search history.

(56) References Cited

U.S. PATENT DOCUMENTS

| | | | |
|---|---|---|---|
| 2002/0067338 A1* | 6/2002 | Adan et al. | 345/156 |
| 2002/0069215 A1* | 6/2002 | Orbanes et al. | 707/500 |
| 2002/0140723 A1* | 10/2002 | Ageta et al. | 345/727 |
| 2002/0171691 A1* | 11/2002 | Currans et al. | 345/864 |
| 2005/0050462 A1* | 3/2005 | Whittle et al. | 715/517 |
| 2005/0213717 A1* | 9/2005 | O'Neil et al. | 379/88.11 |

\* cited by examiner

*Primary Examiner*—Kieu Vu
*Assistant Examiner*—Omar Abdul-Ali
(74) *Attorney, Agent, or Firm*—Merchant & Gould, P.C.

(57) ABSTRACT

Preview content is automatically downloaded to a user's device. When desired, the user may obtain more detailed information relating to the preview information. The more detailed information may be personalized to the user. The user may customize the preview content they receive on their device. For example, using a web interface, the user may select which preview information they wish to receive on their device. Preview content may also be automatically configured for the user. The preview information may be displayed on a low power auxiliary display which is readily visible by the user. The more detailed information may be automatically downloaded based on a user's preferences, or the user may explicitly request to receive the more detailed information.

19 Claims, 9 Drawing Sheets

FIGURE 4

PREVIEWS OF INFORMATION FOR SELECTED DOWNLOAD ON AUXILIARY DISPLAY

BACKGROUND OF THE INVENTION

Mobile electronic devices, such as cell phones, wireless PDAs, wireless laptops and other mobile communication devices are making impressive inroads with consumers. Many of the mobile electronic devices are able to perform a variety of tasks and include a user interface to help the user access the features associated with the device. For example, some mobile devices include a display unit that displays graphical data to support email, instant messaging, web browsing, and other non-voice features. Using their mobile devices, users access the Internet, send and receive email, participate in instant messaging, and perform other operations. Accessing the desired information, however, may be cumbersome and costly for the user.

SUMMARY OF THE INVENTION

Embodiments of the present invention are related to automatically providing preview content to a user and providing the user with the ability to obtain more detailed information when desired. The more detailed information may be personalized for a user.

According to one aspect of the invention, preview content is automatically delivered to a mobile electronic device for access by a user. Using the device, users can quickly view the preview content. When desired, the user may obtain more detailed information relating to the preview information. Examples of the more detailed information might include: a complete news story; hour by hour weather forecast over the next three days; full stock analysis/graph/expert commentary; and sports team standings/scores across the leagues/individual player stats, and the like.

According to another aspect of the invention, the user may customize the preview content they receive on their device. For example, using a web interface, the user may select which preview information they wish to receive on their device. The user may also enter personal information which may be used to obtaining more detailed information that is personalized to the user.

According to yet another aspect of the invention, the more detailed information that is downloaded may be personalized for a user. Instead of the user only being able to download a detailed story that is generalized to a larger population, the user may be able to download a detailed personalized story. For example, a weather story may be personalized based on a user's home address, a traffic story could be personalized based on the user's work and home address, a stock story could be personalized based on the user's stocks, and the like.

According to still yet another aspect of the invention, the preview information may be displayed on a low power auxiliary display which is readily visible by the user. Once the user performs an action, such as touching the display, the more detailed information is downloaded and displayed on the device's primary display.

A more complete appreciation of the present invention and its improvements can be obtained by reference to the accompanying drawings, which are briefly summarized below, to the following detailed description of illustrative embodiments of the invention, and to the appended claims.

BRIEF DESCRIPTION OF THE DRAWINGS

FIG. 4 shows example preview displays that may be displayed on a device;

DETAILED DESCRIPTION OF THE PREFERRED EMBODIMENT

Figure 1:
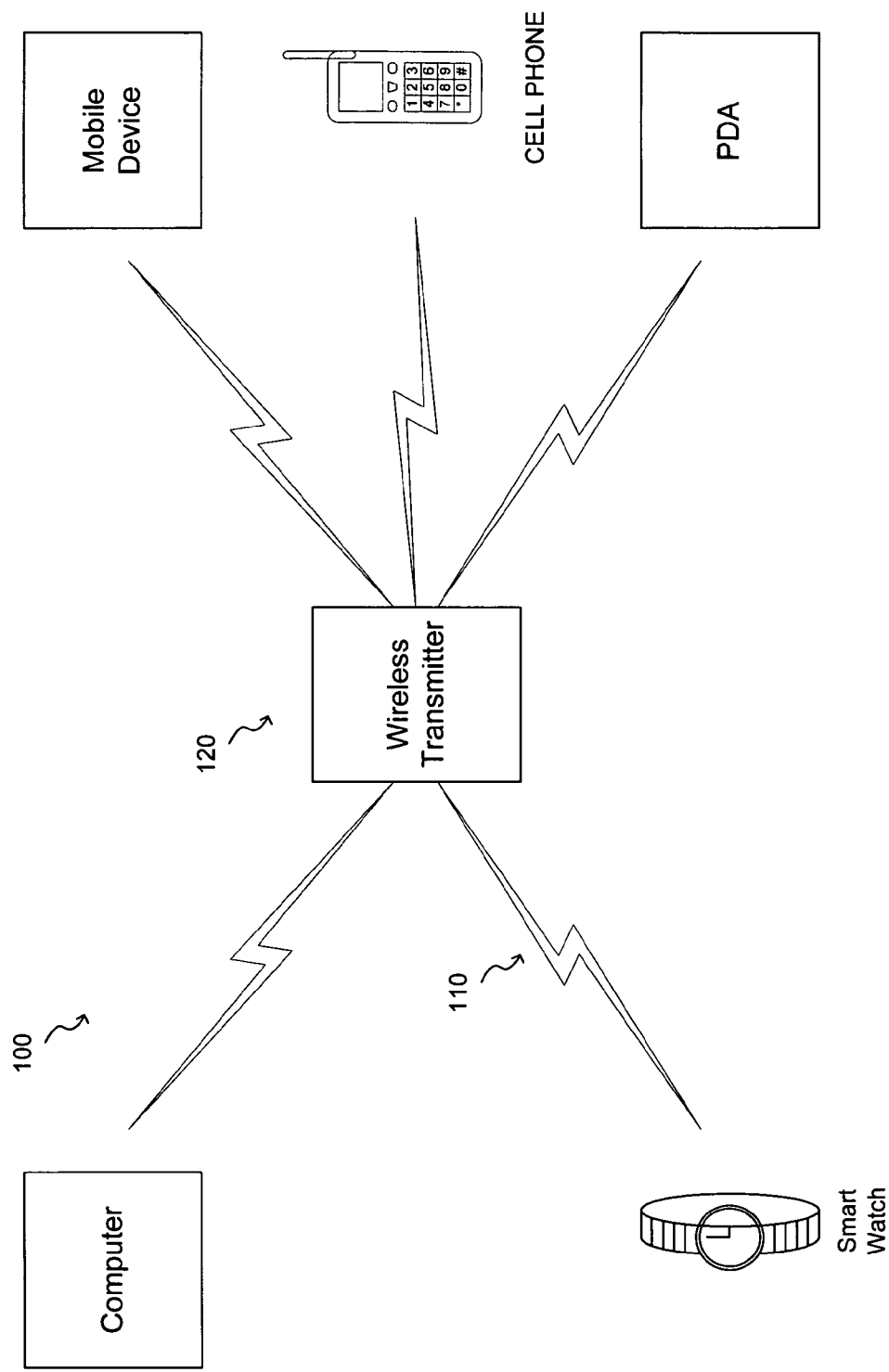
FIG. 1 illustrates an operating environment.

The system and method of the present invention are related to navigating through preview content on a device and determining when to receive and display more detailed information relating to the preview content.

In the described embodiments, the electronic devices may be mobile devices, such as mobile phones, that are specially configured to receive communication signals that include the preview content. The electronic devices may be configured to receive broadcast transmissions from one or more broadcast towers and are capable of receiving and processing messages from the broadcast transmissions.

The preview information displayed by each device may be customized based on user preferences such that the user only receives the preview information they are interested in receiving. Example preview content may include, but not limited to, previews of: news, sports, stock, weather, entertainment, and travel preview information. The user may also enter personal information which may be used in obtaining the more detailed information that is personalized to the user.

The more detailed content that is downloaded in response to the preview content may be personalized based on the user's personal information. Instead of the user only being able to download a detailed story that is generalized to a larger population, the user may be able to download a detailed personalized story. For example, a weather story may be personalized based on a user's home address, a traffic story could be personalized based on the user's work and home address, a stock story could be personalized based on the user's stocks, and the like.

Some user information that could be used to personalize the data include items such as, zip code, neighborhood, job, schools attended, number of children, hobbies, and the like. A user's current location could also be used to personalize the data. For example, a GPS device could be used to provide a current location of a user. Other devices may also provide a user's current location. For example, a network address, a mobile phone, and the like, may provide this capability. Generally, any information that targets information to a user may be used to personalize the content.

Although described here in the context of receiving the preview information and the more detailed information on a mobile cellular telephone, other mobile or non-mobile devices, such as portable and desktop computers, personal digital assistants (PDAs), and the like, may be used. Additionally, more than one device may be used to retrieve the more detailed and/or personalized content. For example, a device that does not have the capability of connecting to the Internet could utilize another device's Internet connection to download the more detailed and/or personalized content. The use of a mobile phone is for illustrative purposes only to simplify the following discussion, and may be used interchangeably with "mobile device" and/or "electronic device".

The term "content" can be any information that may be delivered to an electronic device. By way of example, and not limitation, content may comprise graphical information, textual information, and any combination of graphical and textual information. Content may be displayable information or auditory information. Auditory information may comprise a single sound or a stream of sounds.

Preview Information

Figure 4:
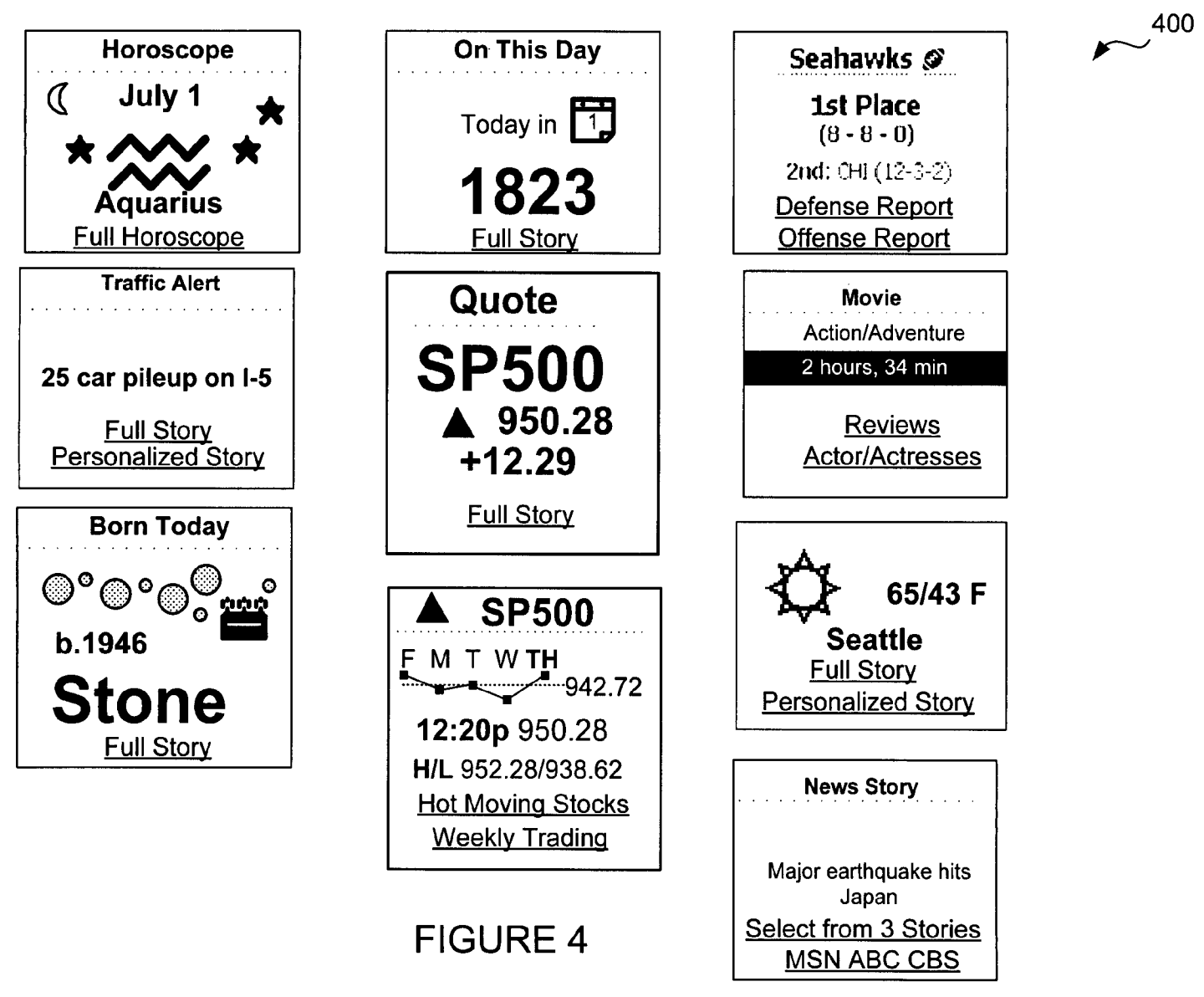

FIG. 4 shows example preview displays that may be displayed on a device, in accordance with aspects of the invention.

The preview information is designed to offer users previews of information without the user having to specifically request and download the preview information. Instead of the user having to specifically "surf" to retrieve content, the preview content is automatically delivered to the user based on a configuration. The previews may be analogized to headlines in a newspaper. By downloading only a portion of the story to the device, not only is bandwidth saved, but the user may more easily determine the full stories that they would like to view.

According to one embodiment the user configures the preview content to be delivered to the device and may provide personal information such that possibly some or all of the detailed content may be personalized for the user. According to another embodiment, the system automatically configures preview content to be delivered to the user's device. After the preview information is configured, the preview content is automatically delivered to the mobile device without the user having to request the content. In other words, the user continually receives new preview content without specifically having to request the content to be delivered to his device. The preview content may include many different types of information.

As illustrated in screen 400, preview information examples include items such as: horoscopes, traffic alerts, vocabulary, trivia, stocks, sports, movies, weather and current news. Many other types of preview information may be delivered to the device.

Each preview may include an indication to the user showing them that more detailed and/or personalized information is available. As illustrated in screen 400, the indications that more detailed information is available are shown underlined. For example, referring to the horoscope preview, the user can see that the full horoscope is available for download. More than one detailed story may be available to the user. For example, in the Seahawks preview the user could view either or both of the available stories, which include the defense report and the offense report. The News Story preview includes three different stories from MSN, ABC, and CBS.

The user may also see that more detail information that is personalized for them is available. Many different previews could include options to include personalized content. The following examples illustrate just a few of the options. For example, the Seattle weather preview shows that a user could view the general weather story or obtain a personalized story. The personalized weather story is directed at providing the user with more relevant information based on their particular characteristics or circumstances. For example, the weather story may provide weather information specifically for their home address and not just for their city in general. The traffic alert preview also includes a personalized story. For example, the personalized traffic story may provide the user with a different route to take home from work.

The user preferences and content may be provided as information that is retrieved from broadcast transmissions such as described herein.

Exemplary Device

Figure 5:
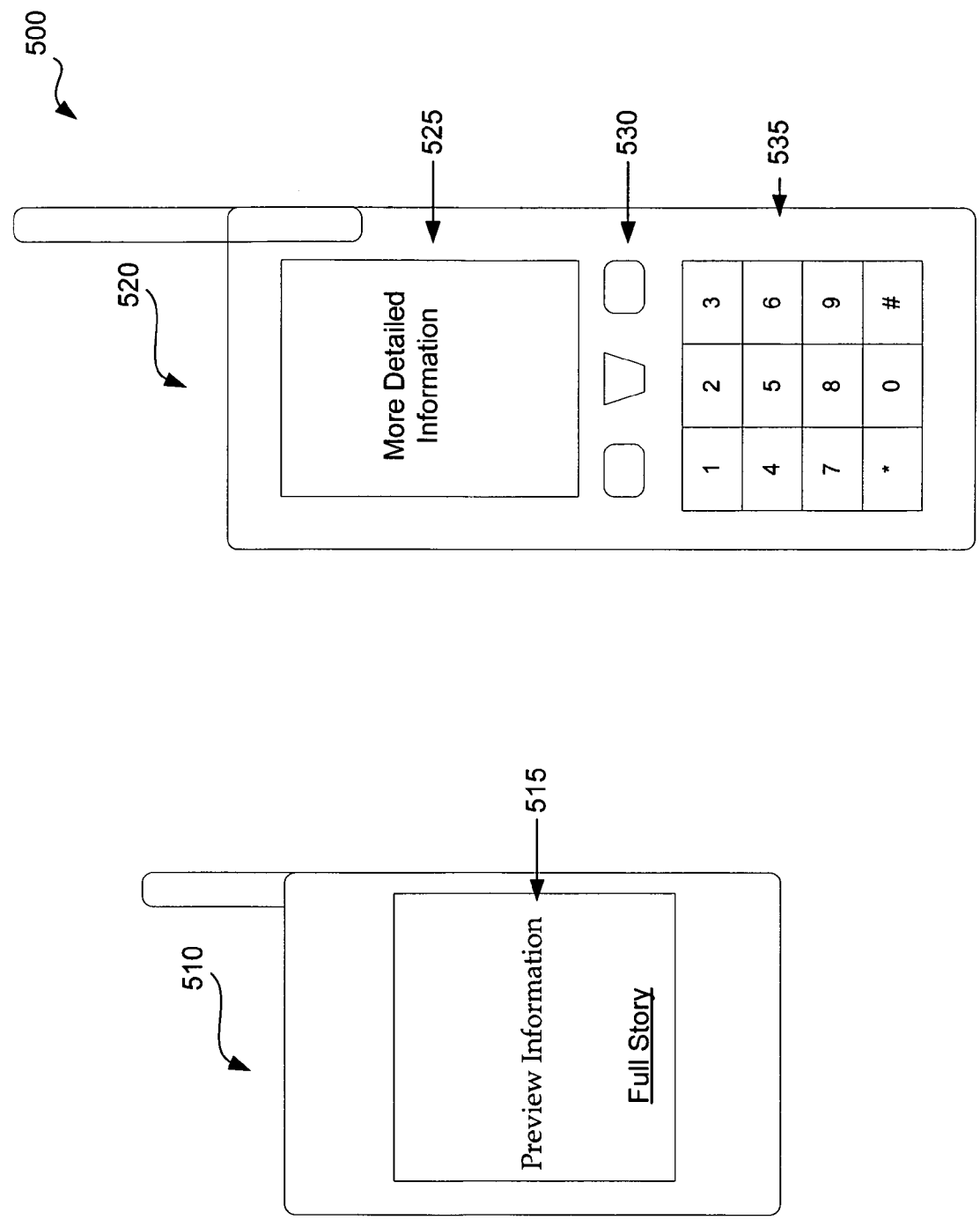
FIG. 5 shows an exemplary mobile device for receiving preview content and providing the user with the ability to obtain more detailed information.

FIG. 5 illustrates an exemplary mobile device for receiving and interacting with preview content, in accordance with aspects of the invention. As illustrated, mobile device 500 is a flip-phone. Display 510 shows the phone closed and display 520 shows the phone flipped open.

When mobile device 500 is closed, auxiliary display 515 is visible to the user. Auxiliary display 515 is configured to display preview information (See FIG. 4 for examples of preview content) to the user. Mobile device 500 includes an electronic system that performs functions in a manner that is consistent with the hardware that is described with respect to FIG. 2. Auxiliary display 515 may be a liquid crystal display, a multiple bit display, a full color display, or any other type of display that may display preview information. According to one embodiment, auxiliary display 515 is a touch screen. In the touch screen embodiment, when the user touches auxiliary display 515 while preview information is being displayed, the device obtains the more detailed information relating to the currently displayed preview content and displays the more detailed information on primary display 525. According to one embodiment, obtaining the more detailed information involves opening a connection with a web site and downloading the content that relates to the preview. Auxiliary display 515 may also be used to display the more detailed information.

When mobile device 500 is flipped open, primary screen 525 is visible to the user which may be used to display more detailed information relating to the preview information. View 520 also shows a series of selectors, such as buttons 530 and keypad 535.

Each selector may have a default function and/or a context determined function. Alternatively, the currently active display may determine the context for each selector. For example, a display screen (e.g., a help screen) may be superimposed on the main display such that the display screen becomes the active context. The keys on device 500 may be context sensitive in that the function that is associated with each selector may change based on the selected preview content or display screen.

According to one embodiment, the user may open mobile device 500 and press a predetermined selector to obtain the more detailed information relating to the preview information. According to another embodiment, when the user flips open the phone, and a call is not currently coming in, the more detailed information is obtained and displayed on primary display 525. According to another embodiment, the user could use one or more selectors to select from one of the available full stories or personalized stories relating to the preview. Additionally, some detailed content may be downloaded automatically based on the user's preferences. For example, a user may desire to download all personalized content when it is available. The user may also desire to only download more detailed content when it relates to a certain selected preview or is marked as important or the content is needed within a certain period of time.

Figure 6:
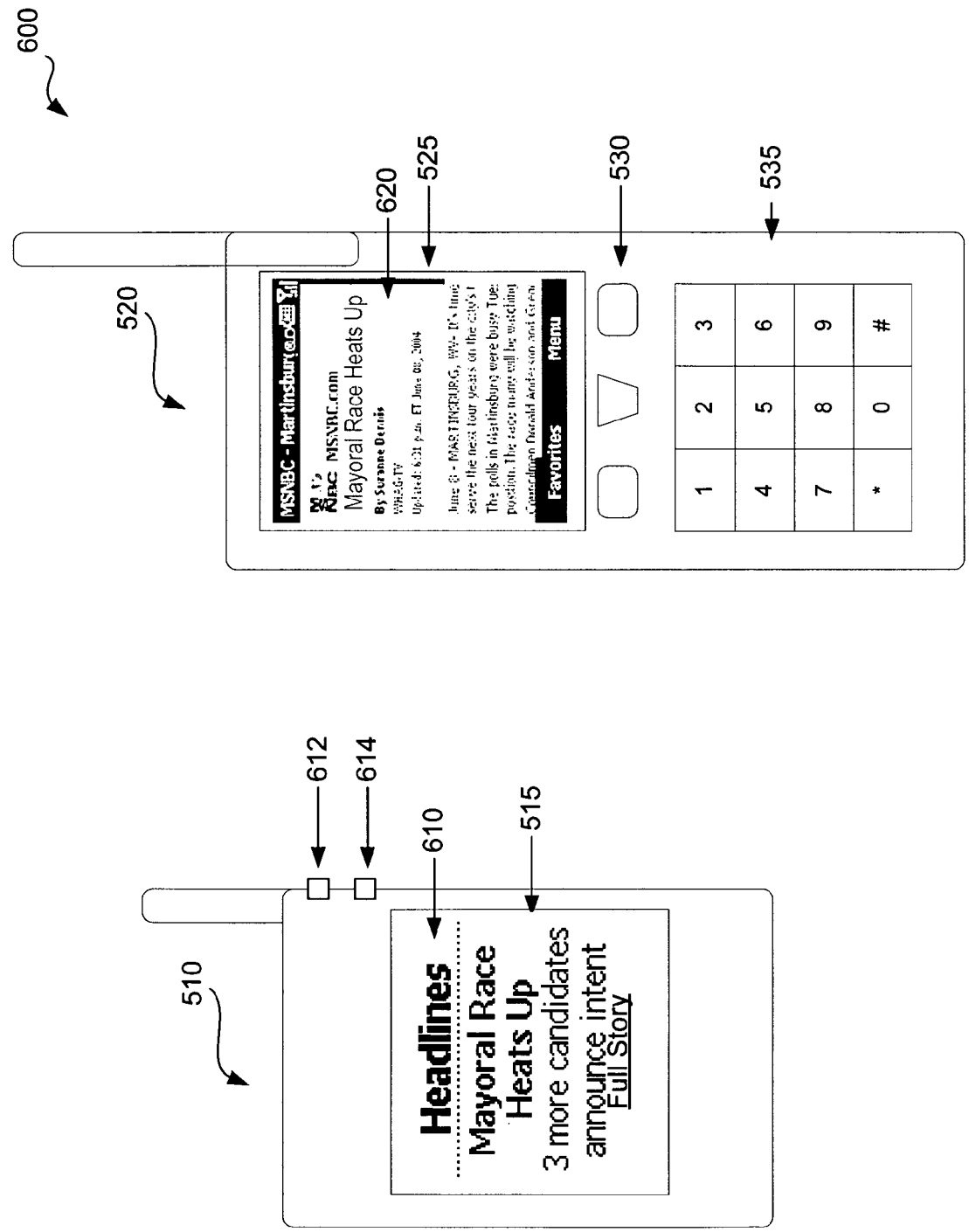
FIG. 6 illustrates example preview content displayed on an auxiliary display and more detailed information displayed on the primary display.

FIG. 6 illustrates example preview content displayed on an auxiliary display and more detailed information displayed on the primary display, in accordance with aspects of the invention.

As illustrated auxiliary display 515 is showing news preview information (610) relating to a mayoral race. More or less information may be presented to the user. For example, each preview could include one or more screens of information. According to one embodiment, each preview is displayed for a predetermined period of time (e.g. 5 seconds) before the next preview is automatically displayed.

According to another embodiment, the user may cycle through the previews by selecting one ore more buttons on the phone. For example, button 612 could be used to move backward through the available previews and button 614 could be used to move forward through the previews. According to one embodiment, the previews are ordered in a circular list. In other words, when the user selects button 614 from the last preview the first preview is displayed. Similarly, when the user selects the previous button 612 while on the first preview, the last preview is displayed. The buttons could also be used to obtain more preview information relating to a specific preview. For example, preview information could have multiple screens of preview information.

Display 520 shows primary display 525 with more detailed information 620 displayed. As can be seen by this example, the more detailed information (620) includes much more detail than the preview (610).

Figure 7:
FIG. 7 illustrates a web interface for selecting news preview information to be automatically delivered to a device.

User Interface for Configuring Preview Information to be Displayed on the Device FIG. 7 illustrates a web interface for selecting news preview information to be automatically delivered to a device, in accordance with aspects of the invention.

Various options relating to preview content can be selected via a computer type interface such as through an internet based application, a computer based application, or any other reasonable method of accessing and altering configuration information. In one embodiment, a user can access a web page to select or change the preview information they receive on their device.

News sources can be selected via a computer type interface such as through an internet based application, a computer based application, or any other reasonable method of accessing and altering configuration information. In one embodiment, a user can accesses web page 700 to select or change various features associated with the news preview information. In another embodiment, news sources already selected on a user's Internet home page may be retrieved from the user's home web site and then used to select the available news sources.

All of the available news sources can be selected or unselected. When the user unselects all of the news sources, the channel is not shown on the device.

When configuring the previews of news information, the user can also select one or more sources for each of the categories. The user can select as many sources for a category as they want. The following is an exemplary list of news sources: Business (Business Week, AP-Business, Reuters—Business, MSNBC Business News, CNBC; Wall Street Journal); Entertainment (MSN Entertainment News, AP-Entertainment, Reuters—Entertainment); Headline (AP, Reuters, Front Page News, Top Stories, Washington Post); Sports (Sporting News—Sports, AP-Sports, Reuters—Sports); World News/Int'l (Reuters—International, AP International, MSNBC International); Health (WebMD, MSNBC—Health); Home and Family (MSNBC Family News); Technology (MSNBC Technology, Reuters (Science), Reuters (Space), Reuters (Technology), Space.com); Travel (MSNBC Travel (Business), MSNBC Travel (Promotions), MSNBC Travel (Security)); Stocks (MSNBC Stock Market Report); Weather (Top Weather stories); Living (MSNBC Living); and Local (local stations).

When the user selects the save button the changes are made to the news channel. The user can return to the web site at anytime and change the selection of the categories.

Similar web interfaces may be used to select other types of preview information. A similar interface may be used to gather personal information from the user.

A configuration message is broadcast to the device once the preview information and personalized information is configured. The configuration message includes the selected sources and preferences as set using the web user interface. Additionally, information may be sent to the device as to how best display the preview content. This information is then used by the device to display the preview content the device receives from broadcasts.

Figure 8:
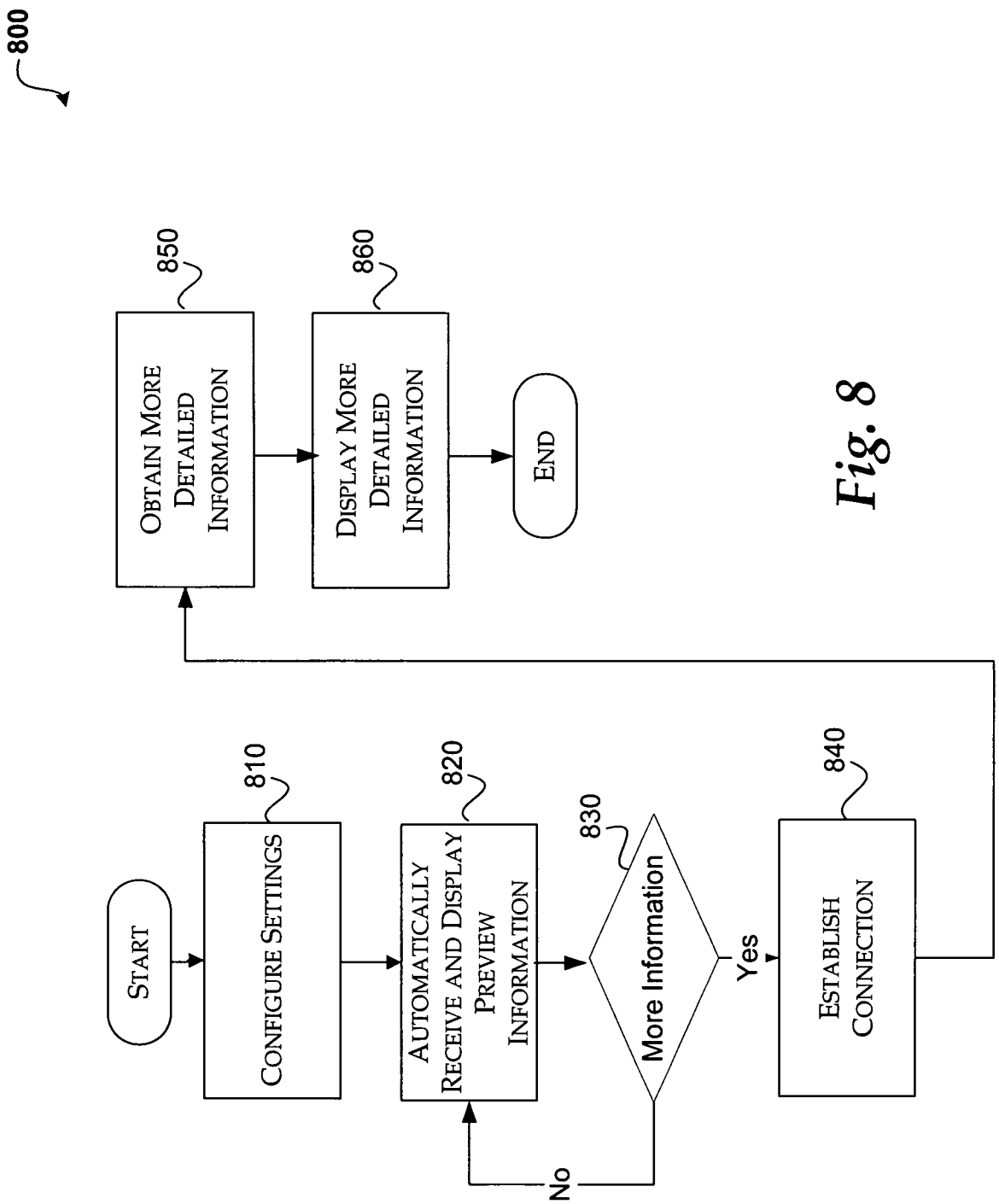
FIG. 8 shows a process for receiving and interacting with preview information.

FIG. 8 shows a process for receiving and interacting with preview information, in accordance with aspects of the invention. After a start block, the process moves to block 810 where the user may configure the settings associated with their device. During this step, the user may select the previews they desire to display on their device as well as configuring personal information that may be used to personalize the more detailed content. The user may also configure the more detailed information that they would like to be automatically downloaded to their device when a preview is received by their device. For example, some types of previews (such as alerts) may be marked by the user such that when they are received the more detailed and/or personalized information should be downloaded automatically.

Moving to block 820, the preview information is automatically received by the user's device. The user does not have to specifically request the preview content to be retrieved. This not only saves the user time in not having to access each story individually, but saves on bandwidth and cost as compared to the user downloading each story individually. Once the preview content is received, it is displayed on the user's device. According to one embodiment, the preview content is displayed on a low power auxiliary display. The preview content, however, may be displayed on any available display.

Flowing to decision block 830, a determination is made as to whether the user desires to view more detailed information relating to the preview. One or more detailed stories that may include personalized information may be available. This determination may be based on many different types of user inputs. For example, the user could open their flip-phone or press one or more selectors on the device. Additionally, some detailed or personalized content may be automatically downloaded by the device. For example, a user could indicate through a setting that all content relating to receiving a specific type of preview should be automatically downloaded to the device. When more detailed information is not desired, the process returns to block 820.

When more detailed information is desired, the process moves to block 840 where a connection is established with the source of the information. For example, the source of the information may be a website, or some other data store. As discussed above, the connection may be established using one or more devices.

Once the connection with the data source is established, the process flows to block 850, where the more detailed information is obtained. As discussed above, the more detailed information includes more details as compared to the preview content. For example, in the example illustrated in FIG. 6, the more detailed information included the full news story. Additionally, the more detailed information may be personalized according to personal information relating to the user.

Moving to block 860, the more detailed information is displayed on the device. According to one embodiment, the more detailed information is displayed on the primary display of the user's device. The detailed information, however, may be displayed on any available display.

The process then moves to an end block and returns to processing other actions.

Encoding

Figure 9:
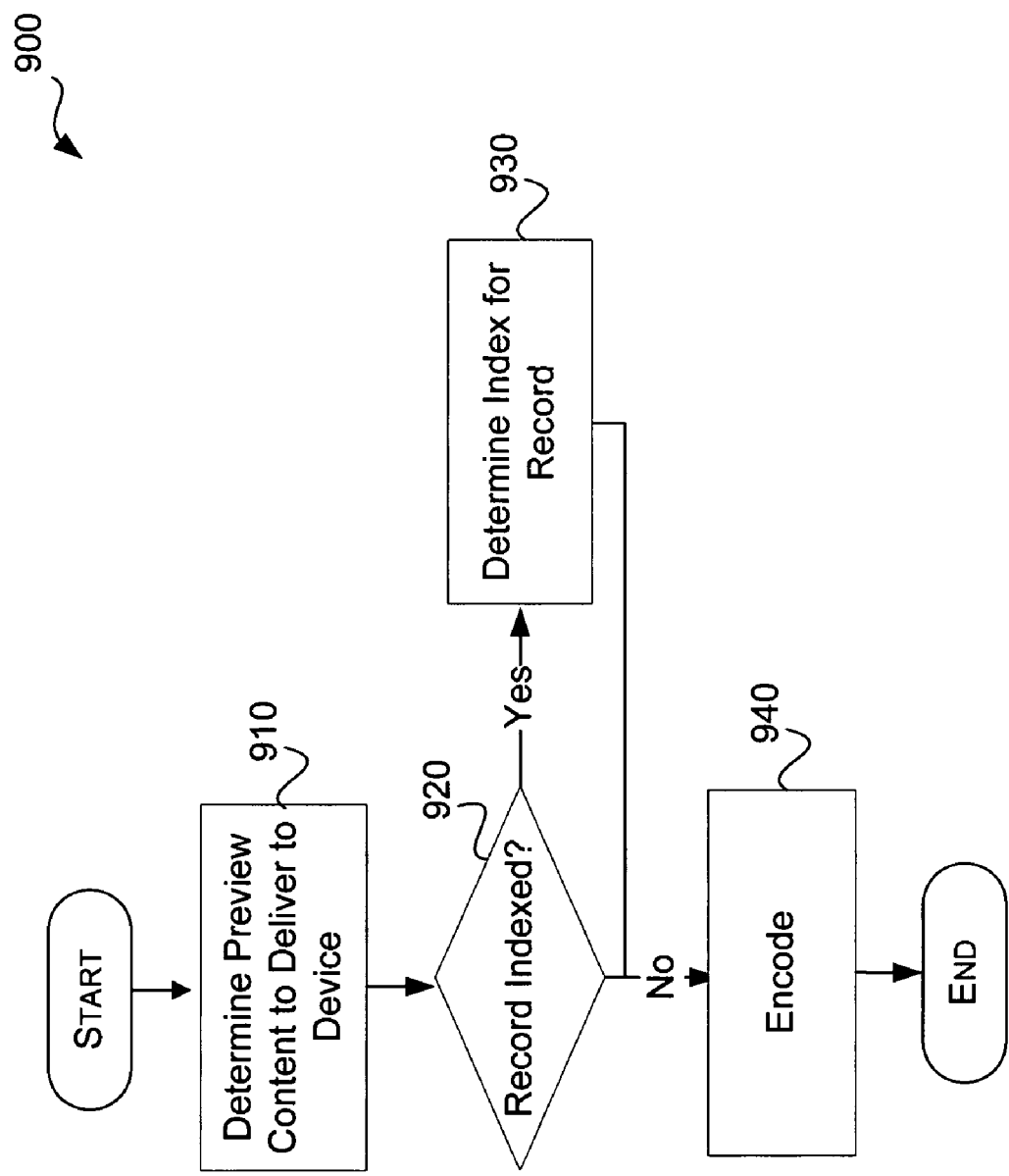
FIG. 9 illustrates encoding preview content, in accordance with aspects of the present invention.

FIG. 9 illustrates encoding preview content, in accordance with aspects of the invention. After a start block, the process moves to block 910 where a determination is made as to what preview content is going to be delivered to the device.

Moving to decision block 920, a determination is made as to whether the data is part of an index. Generally, any information that is static and that is broadcast multiple times may be encoded as an index. For example, horoscope astrological signs may be encoded as part of an index, such that each astrological sign name does not need to be delivered to the device each time the sign is referenced. Other examples that may be indexed include, but are not limited to: team names, city names, country names, movie theaters, stock names, and the like. Indexing the content dramatically cuts down the amount of data that needs to be broadcast. The content is indexed by assigning an ID to each name that remains static. According to one embodiment, each index starts at one and ends at the last name. The names and their associated IDs are delivered to the device in a configuration message such that when the device receives previews relating to and indexed broadcast the device may associate the ID with the name.

When the record is encoded as an index, the process moves to block 930, where the index value is determined for the record.

When the record is not encoded as an index, the process moves to block 940, where the record is encoded. According to one embodiment, the value of the record is stored within a predetermined number of bits. For example, a year may be encoded in x number of bits whereas a description may encoded in more bits. The process then moves to an end block and returns to processing other actions.

Operating Environment

FIG. 1 illustrates an example operating environment, in accordance with aspects of the present invention. As illustrated, operating environment 100 includes wireless transmitter 120 that is responsible for delivering preview content to wireless devices. According to one embodiment, the wireless transmitter may include a cellular tower that is used to communicate with mobile devices, such as cell phones, notebooks, pocket PCs, long-distance communication links, and the like. According to another embodiment, the wireless transmitter may include an FM transceiver that broadcasts signals over communication channel 110 to the various electronic devices. The FM broadcast may be any number of types including but not limited to: a standard FM transmission, a sub-carrier FM transmission, or any other type of FM transmission as may be desired. Example electronic devices that have an FM receiver or transceiver may include a desktop computer, a watch, a portable computer, a wireless cellular telephone (cell phone), and a personal data assistant (PDA). The electronic devices are arranged to receive information from the wireless broadcast.

Some example electronic devices that may include an electronic system arranged to operate according to the interaction model are illustrated in FIG. 1. Each of the electronic systems receives messages/information over the communication channel.

According to one embodiment, each broadcast transmission corresponds to the transmission of one or more frames. Each frame may include multiple messages, where some messages are public broadcast (aka "global" or "shared" messages), while other messages are client specific messages (aka "personal" or "private" messages). Every client that is located within the designated service region may receive shared messages, while a single client may decode a private message.

Electronic devices (e.g., a wireless watch device) receive message packets according to shared and private messages that are directed to the client device. Message packets are organized in groups according to logical slot (or channel) entry numbers. For example, a particular electronic device may be configured to receive a selected group of channels from the available channels. The message packets associated with each of those channels is received, processed, and may be stored in the client device. The message packets can be reviewed on a display of the receiving device.

Example preview channels include: diversion channels (lottery, horoscope, daily diversions), a sports channel, a time channel, a messages channel, a calendar channel, a stocks channel, a news channel, and a movies channel. Messages associated with each channel include message content that is based on the particulars of the channel. For example, the lottery channel may include lottery information whereas a horoscope channel may include horoscope information.

Figure 2:
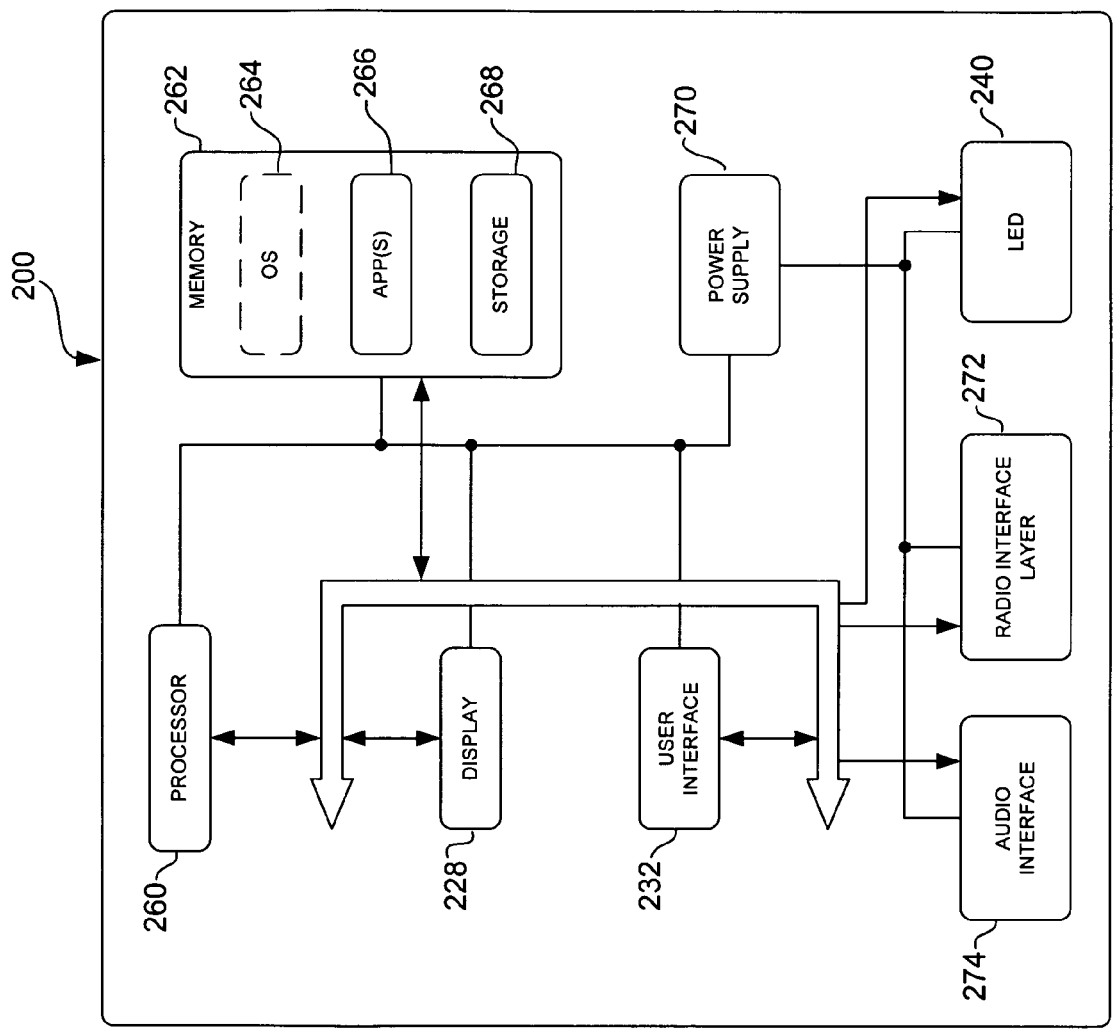
FIG. 2 shows an electronic device.

FIG. 2 is a schematic diagram illustrating functional components of an illustrative electronic device that may be used to interact with channel content, in accordance with aspects of the invention. Electronic device 200 includes processor 260, memory 262, display 228, and user interface 232. Memory 262 generally includes both volatile memory (e.g., RAM) and non-volatile memory (e.g., ROM, Flash Memory, or the like). Electronic device 200 may include an operating system 264, such as the Windows CE operating system from Microsoft Corporation or another operating system, which is resident in memory 262 and executes on processor 260. User interface 232 may be a series of push buttons, a scroll wheel, a numeric dialing pad (such as on a typical telephone), or another type of user interface means. Display 228 may be a liquid crystal display, or any other type of display commonly used in electronic devices. In one example, display 228 may be touch-sensitive that would act as an input device. According to one embodiment, display 228 includes both an auxiliary display and a primary display.

One or more application programs 266 are loaded into memory 262 and run on the device. Examples of application programs include lottery programs, horoscope programs, sports programs, calendar programs, movie programs, time programs, and so forth. Electronic device 200 also includes non-volatile storage 268 that is located within memory 262. Non-volatile storage 268 may be used to store persistent information which should not be lost if electronic device 200 is powered down. Applications 266 may use and store information in storage 268, such as preview content.

Electronic device 200 includes power supply 270, which may be implemented as one or more batteries. Power supply 270 might further include an external power source, such as an AC adapter or a powered docking cradle that supplements or recharges the batteries.

Electronic device 200 is also shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation, or as a user interface using voice recognition. In another example, a vibration device (not shown) can be used to give feedback to the user such as for alerting the user of a newly arrived content. Electronic device 200 can control each alert mechanism separately (e.g., audio, vibration, as well as visual cues).

Electronic device 200 also includes a communication connection, such as radio interface layer 272, which performs the function of receiving and/or transmitting radio frequency communications. Radio interface layer 272 facilitates wireless connectivity for electronic device 200. Transmissions to and from radio interface layer 272 are conducted under control of the operating system 264. In other words, communications received by radio interface layer 272 may be disseminated to application programs 266.

"Computer readable media" can be any available media that can be accessed by client/server devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices. Communication media typically embodies computer readable instructions, data structures, program modules or other data in a modulated data signal such as a carrier wave or other transport mechanism and includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are included within the scope of computer readable media.

In one example of the present invention, electronic device 200 is a mobile electronic device such as a mobile telephone device that includes a wireless interface. An exemplary watch device is shown in FIG. 3.

Broadcast of Preview Information

Figure 3:
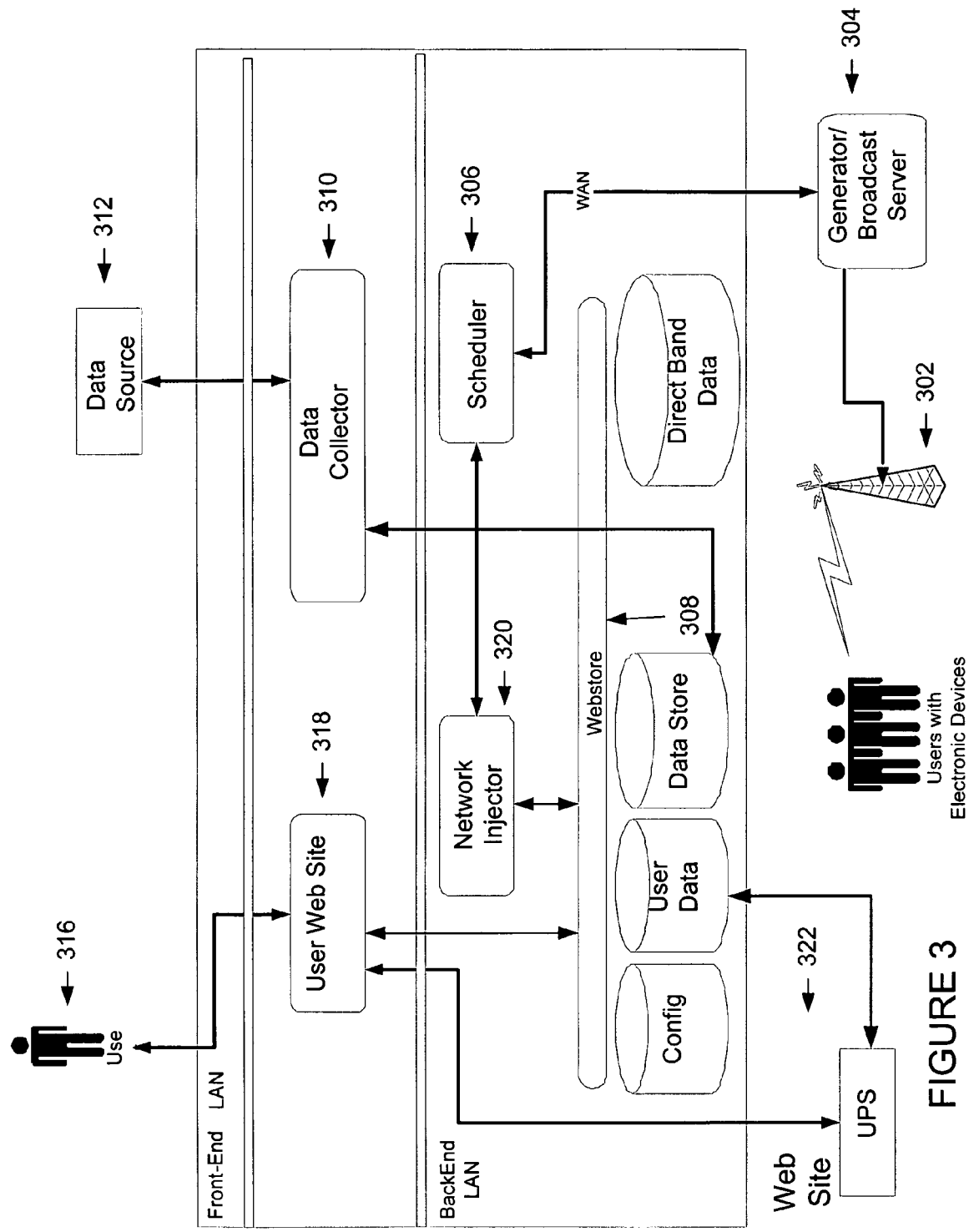
FIG. 3 illustrates a system for delivering and configuring preview information to an electronic device.

FIG. 3 illustrates a system for delivering and configuring preview information to an electronic device, in accordance with aspects of the invention.

A user, such as user 316, may customize the preview information they receive on their device. According to one embodiment, the user selects from an available set of preview channels relating to various topics through user web site 318. Using website 318 the user may set options and select information associated with the preview information they wish to receive. For example, the user may select the news preview content they desire to receive using website 318. The selected options are stored in a data store, such as webstore 308. Preview information the user is interested in viewing may also be automatically retrieved from a web site to which the user participates in. For example, web site 322 may be the user's home page in which the user has already selected various options customizing their page. These options may be used to populate the options associated with the preview information that will be delivered to the user's device. For example, a user's selected cities may be used for weather preview information the user's selected sports teams may be used to determine sporting previews to deliver to the user's device, a user's selected stocks they desire to track may be used to deliver stock previews, and the like. These options may also be used to retrieve personalized content for the user.

Data Collector 310 is configured to collect data from one or more data sources, such as data source 312. For example data collector 310 may retrieve news content from one data source, sports content from another source, and weather content from another data source. Preview content may also be obtained from files that may or may not be updated periodically. Other preview content may be obtained from a live feed.

Because some data is date-sensitive but not particularly time-sensitive, those items are sent with higher priority very early in the morning (i.e. midnight-5 AM) and with much lower priority during the day, to make room in the broadcast bandwidth for time-sensitive items such as stock prices, news items, and sports scores.

After the data is obtained, the data is encoded and then sent to the device. The data collected by data collector 310 may be stored in a data store, such as webstore 308, for later broadcast.

Broadcast transmitter tower 302 is arranged to provide a communication signal that is configured for reception by users with electronic devices that are located within a service region. Broadcast tower 302 transmits in response to generator/broadcast server 304. Generator 304 may communicate with scheduler 306 via a network communication link. Scheduler 306 is configured to schedule broadcast transmissions relating to channel information.

Selected services are entered in a database, such as webstore 308 for broadcast transmission at a later time. At the designated time (or time interval) scheduler 306 communicates with broadcast server 304 to begin a transmission sequence of data for the selected services. Broadcast server 304 converts the data to the appropriate format for transmission (i.e. an FM signal) and relays it to broadcast tower 302. In an alternative example, scheduler 306 communicates the selected services to the broadcast server. The broadcast server schedules the time interval for transmission of the selected service.

Each broadcast transmission corresponds to the transmission of one or more frames that are arranged in accordance with a frame protocol. Each frame may include multiple messages, where some messages are public broadcast (aka "global" or "shared" messages), while other messages are client specific messages (aka "personal" or "private" messages). Each frame includes a table of contents that indicates the extent of messages that are found within the next transmitted frame. Every client that is located within the designated service region receives the shared and personal messages. Personal messages, however, may only be decoded by a single client.

Each frame includes a header, a table of contents, and a message payload that includes the content for one or more selected services as previously described. The header also includes other information such as authentication data, identified service region, language, available stations for the identified service region, frame number, and time stamp. Control information may also be included in one of the headers to indicate broadcast conditions such as a change in available preview information, an assignment of a service region to a particular wireless client device, and an assignment of a particular channel (frequency) on which to receive preview information. In one example, each frame includes a change counter in one of the headers to indicate a change has taken place in the system. Wireless client devices (clients) may use the change counter to determine when to initiate a failover (when a broadcast tower becomes unavailable).

Client devices can determine the current service region based on information that is included in the broadcast transmissions. The time zone can be determined based on the current service region such that the client device can adjust any time related information. Moreover, the time and date functions of the client device may be synchronized based on information that is included in the broadcast transmissions.

Some data changes fairly rarely and therefore may be sent by broadcast server 304 as part of the configuration of the preview information on the electronic device. For example, the electronic device may store a name and corresponding ID of the name such that when it receives a broadcast transmission the device may match the ID with the name. According to one embodiment, a stream of names is broadcast at predetermined intervals. When a device needs a name, the name is accessed within the stream by an index value. According to another embodiment, whenever a name changes a configuration message is prepared and sent to users who have selected that team.

Links pointing to the full content may also be included in the broadcast of the preview information. One or more links may be included in the preview information. According to another embodiment, the device may automatically configure the links based on their personalized information. The device could fill in the parts of the link relevant to the user of the device. For example, the device may place the user's zip code in a link to retrieve the full weather information for the user's zip code area.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for receiving and interacting with preview content on a mobile electronic device, comprising:

receiving the preview content on the mobile device that is encoded on a communication signal, wherein the communication signal is broadcast to many electronic devices and wherein the preview content is a preview of more detailed information that is available to a user; wherein the preview content is determined from configuration settings set by a user; wherein the configuration settings comprise: preview sources to automatically download to the mobile device; personal information used to personalize the preview content and the more detailed information relating to the preview content; and an option to automatically download the more detailed information for the preview content when the preview content is received; wherein after the configuration settings are selected by the user a configuration message is received on the mobile device that is sent from another computing device that comprises the preview sources selected and information on how to display the preview content;

displaying the preview content on an auxiliary display of the mobile electronic device; wherein the mobile electronic device includes a primary display and the auxiliary display; wherein the auxiliary display and the primary display are different physical displays on the mobile device; wherein displaying the preview content comprises displaying a first portion of the preview content for a predetermined period of time on the auxiliary display and then replacing the display of the first portion of the preview content with a second portion of the preview content after the predetermined period of time; wherein a portion of the preview content that is displayed within the auxiliary display changes in response to a selection on the mobile device; wherein the display of the preview content on the auxiliary device includes an indication when a full story is available for download; when a personalized story is available for download; and when more than one story is available to be downloaded that relates to the preview content;

determining when the user desires to view more detailed information relating to the preview content, and when it has been determined that the user desires to view the more detailed information;

determining when the detailed information is on the device; wherein the detailed information is automatically downloaded to the device based on the configuration settings personalized by the user;

when the detailed information is not on the device then establishing a connection with a data store that provides the more detailed information;

obtaining the more detailed information; and displaying the more detailed information on the primary display of the mobile device.

2. The method of claim 1, wherein receiving the preview content, comprises automatically receiving the preview content without interaction by the user.

3. The method of claim 2, further comprising configuring the preview content to be received by the device.

4. The method of claim 3, wherein configuring the preview content, comprises obtaining user preferences from a web interface.

5. An apparatus for receiving, navigating, and displaying preview content, comprising:

a data store;

a communication connection configured to receive a broadcast communication signal including the preview content that is directed to a plurality of mobile electronic devices and storing at least a portion of the preview content in the data store; wherein the preview content is determined from configuration settings set by a user; wherein the configuration settings comprise: preview sources to automatically download to the mobile device; personal information used to personalize the preview content and the more detailed information relating to the preview content; and an option to automatically download the more detailed information for the preview content when the preview content is received; wherein after the configuration settings are selected by the user a configuration message is received on the mobile device that is sent from another computing device that comprises the preview sources selected and information on how to display the preview content;

a primary display;

an auxiliary display; wherein the primary display is a separate physical display from the auxiliary display;

a user interface that includes a selector that is activated to obtain more detailed information relating to the preview content; and an electronic system that is arranged to interact with the user interface, the data store, the communication connection, and the primary display and the auxiliary display, wherein the electronic system is configured to:

display the preview content on the auxiliary display; wherein displaying the preview content comprises displaying a first portion of the preview content for a predetermined period of time on the auxiliary display and then replacing the display of the first portion of the preview content with a second portion of the preview content after the predetermined period of time; wherein the display of the preview content includes an indication when a full story is available for download; when a personalized story is available; and when more than one story is available to be downloaded;

determine when to download more detailed information; and when it is determined to download the more detailed information:

establish a connection with an external data store that provides the more detailed information;

obtain the more detailed information; and display the more detailed information on the primary display.

6. The apparatus of claim 5, wherein the determining when to download more detailed information comprises determining when the user activates the selector.

7. The apparatus of claim 5, wherein the display includes an auxiliary display and a primary display, and wherein displaying the preview content comprises displaying the preview content on the auxiliary display and displaying the more detailed information comprises displaying the more detailed information on the primary display.

8. The apparatus of claim 5, wherein obtaining the more detailed information comprises obtaining more detailed information that is personalized to a user.

9. The apparatus of claim 8, wherein obtaining the more detailed information that is personalized to the user comprises obtaining personal information about the user and determining when the user has selected to download the more detailed information that is personalized to the user.

10. The apparatus of claim 9, wherein determining when the user has selected to download the personal information comprises examining a user setting indicating to automatically obtain the more detailed information that is personalized.

11. The apparatus of claim 9, wherein determining when the user has selected to download the personal information comprises determining when the preview information relates to at least one of a timely event and an important event and when the preview information relates to at least one of the timely event and the important event automatically downloading the more detailed information that is personalized.

12. The apparatus of claim 5, further comprising a location device configured to provide a current location for the user; wherein the current location is used to configure the preview content.

13. A system for providing and interacting with preview content, comprising:

a data source configured to store more detailed information relating to the preview content, wherein the more detailed information may be personalized for a user;

a data collector configured to collect the preview content;

a broadcast device configured to transmit a communication signal including at least a portion of the preview content to a plurality of mobile electronic devices at the same time;

a mobile electronic device, having:

a data store;

a communication connection configured to receive the communication signal and store at least a portion of the preview content in the data store; wherein the preview content is determined from configuration settings set by a user; wherein the configuration settings comprise: preview sources to automatically download to the mobile device; personal information used to personalize the preview content and the more detailed information relating to the preview content; and an option to automatically download the more detailed information for the preview content when the preview content is received; wherein after the configuration settings are selected by the user a configuration message is received on the mobile device that is sent from another computing device that comprises the preview sources selected and information on how to display the preview content;

a primary display that is viewable when a lid on the mobile device is in an open position;

an auxiliary display that is located on the lid of the mobile device; wherein the auxiliary display and the primary display are separate physical displays;

a user interface that includes a selector; and an electronic system that is arranged to interact with the communication connection, the user interface, the data store and the display, wherein the electronic system is configured to:

select a current view associated with the preview content;

display the current view on the auxiliary display; wherein displaying the current view comprises displaying current view for a predetermined period of time on the auxiliary display and then replacing the display of the current view with another portion of the preview content after the predetermined period of time; wherein the display of the current view includes an indication when a personalized story is available; and when more than one story is available to be downloaded;

in response to the lid on the mobile device being placed in the open position:

obtain the more detailed information from the data source; and display the more detailed information on the primary display.

14. The system of claim 13, wherein the display on the mobile device includes an auxiliary display and a primary display, and wherein displaying the current view comprises displaying the current view on the auxiliary display and displaying the more detailed information comprises displaying the more detailed information on the primary display.

15. The system of claim 13, wherein selecting the current view associated with the preview content comprises automatically cycling through preview content at a predetermined rate.

16. The system of claim 13, wherein the broadcast device is configured to broadcast an FM communication signal.

17. The system of claim 16, wherein the preview content is configured for each device.

18. The system of claim 17, further comprising a server configured to receive user preferences associated with users receiving the preview content, wherein the user preferences may include data relating to previews to be received on the mobile electronic device and data relating to personal information about the user.

19. The system of claim 17, further comprising a location device coupled to the mobile device and that is configured to provide a current location for the user; wherein the current location is used to configure the preview content.

* * * * *